(12) United States Patent
Sieber et al.

(10) Patent No.: US 7,867,591 B2
(45) Date of Patent: Jan. 11, 2011

(54) ASSEMBLY TAPE WITH PERFORATION AND EXPANSION RESERVE

(75) Inventors: Marco Sieber, Horw (CH); Reto Sieber, Sigigen (CH)

(73) Assignee: SILU Verwaltung AG, Meggen (CH)

( * ) Notice: Subject to any disclaimer, the term of this patent is extended or adjusted under 35 U.S.C. 154(b) by 555 days.

(21) Appl. No.: 11/598,878

(22) Filed: Nov. 14, 2006

(65) Prior Publication Data

US 2007/0110943 A1   May 17, 2007

(30) Foreign Application Priority Data

Nov. 14, 2005   (DE) .................... 10 2005 054 236

(51) Int. Cl.
  *B32B 9/00*   (2006.01)
  *B32B 33/00*  (2006.01)
  *B32B 3/10*   (2006.01)

(52) U.S. Cl. .................... 428/40.1; 428/130; 428/131; 428/906

(58) Field of Classification Search ............... 428/40.1, 428/131, 134–146, 906, 121, 130; 604/389, 604/390

See application file for complete search history.

(56) References Cited

U.S. PATENT DOCUMENTS 4,670,012 A * 6/1987 Johnson .................... 604/390

| 2003/0017292 A1 | 1/2003 | Sieber et al. |
| 2004/0137185 A1 | 7/2004 | Sieber et al. |
| 2005/0042404 A1 | 2/2005 | Sieber et al. |
| 2005/0058798 A1 | 3/2005 | Sieber et al. |

FOREIGN PATENT DOCUMENTS

| DE | 201 07 230 | 8/2001 |
| DE | 20121253   | 7/2002 |
| DE | 10135799   | 2/2003 |
| DE | 201 21 930 | 10/2003 |
| DE | 203 11 693 | 11/2003 |
| DE | 202 20 904 | 7/2004 |
| DE | 10337880   | 12/2004 |
| DE | 100 31 213 | 10/2005 |

* cited by examiner

*Primary Examiner*—Patricia L Nordmeyer
(74) *Attorney, Agent, or Firm*—Fish & Richardson P.C.

(57) ABSTRACT

Pressure-sensitive tape for closing, sealing, and gluing joints, in particular in housing construction, and in particular joints in corners and edges, with a backing on the tape side, an adhesive coating of at least a portion of the backing on the tape bottom side, and a removable protective film for the adhesive coating on the tape bottom side. In at least one edge area the tape has at least on perforation area where at least the backing is perforated, and the tape has at least one expansion reserve.

30 Claims, 1 Drawing Sheet

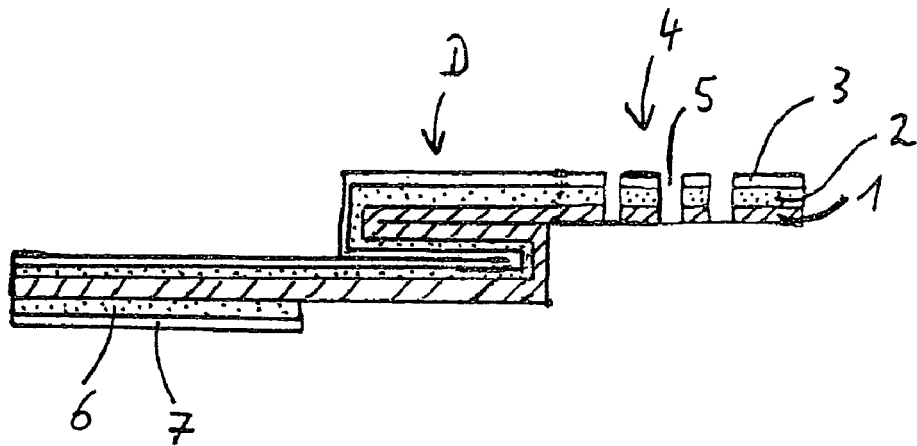
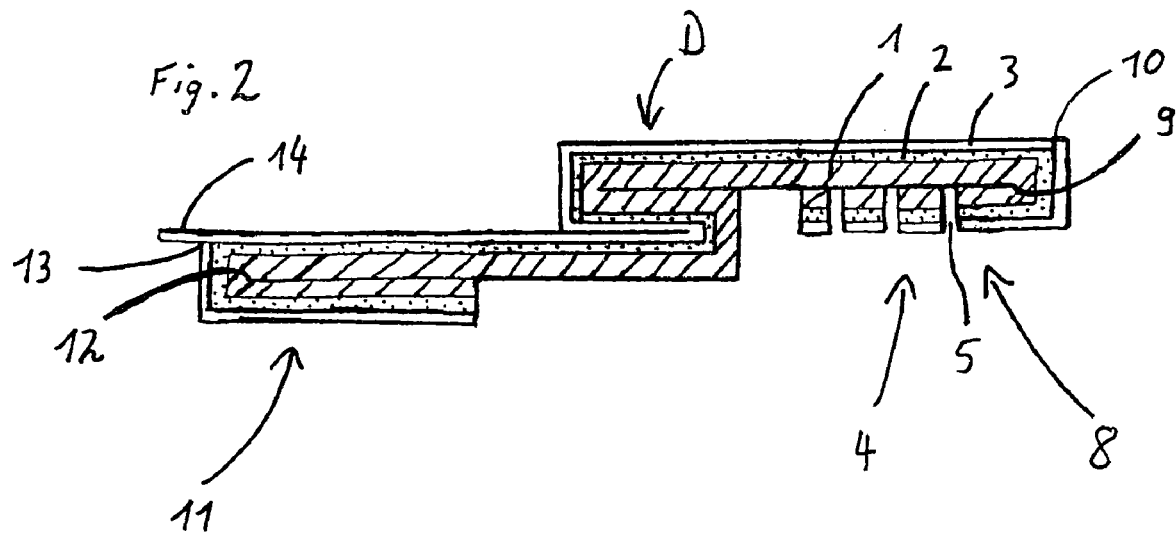

ASSEMBLY TAPE WITH PERFORATION AND EXPANSION RESERVE

BACKGROUND OF THE INVENTION

The invention relates to a pressure-sensitive adhesive tape for closing, sealing, and gluing joints, in particular in housing construction, and in particular joints in corners and edges, with a backing on the tape top side, an adhesive coating of at least a portion of the backing on the tape bottom side, and a removable protective film for the adhesive coating on the tape bottom side.

In general adhesive tapes are used e.g. in housing construction when different structural elements, such as doors or windows, are to be inserted into a wall opening and the joint that occurs between the structural elements and the corresponding wall opening must be closed, which must especially occur when installing such structural elements in the exterior walls of buildings in order to attain appropriate sealing.

One general problem of such pressure-sensitive tapes is attaining a good seal, with the least complicated usage possible, by correctly applying such tapes in areas that are difficult to access in order that the joints are closed as air-tight and moisture-tight as possible. In particular, depending on the installation situation, the width of the joints to be closed can vary widely at a single construction site so that a plurality of tapes with different widths are required in order always to be able to use an appropriate tape width (where required even alternating by section e.g. for a window to be installed or the like, which can have a deleterious effect on the seal). Also certain attachment of the tape to the wall, i.e. to the masonry or other wall material, must be assured in order to ensure satisfactory sealing under all circumstances. What must not happen is that due to an available tape width that is too small a perforated plastering area remains unplastered and thus exposed parts of the perforation have a deleterious effect on the seal.

German Offenlegungsschrift DE 101 35 799 A1 from the same applicants as the present invention indicates an assembly tape for improved joint sealing with a suitable assembly tape dispenser, whereby the corresponding assembly tape has on the tape bottom side an adhesive layer provided on a backing on a tape top side, the adhesive layer being provided with a removable protective film on the tape bottom side. The protective film has a slit running in the longitudinal direction and the tape is folded once upon itself in the transverse direction along this slit such that at least a portion of the protective film is disposed on the exterior, that is, on the tape top side. Furthermore, this tape has at least one lateral longitudinal section that is perforated. A special assembly tape dispenser for receiving and dispensing the assembly tape is provided in order to be able to securely handle the rolled-up adhesive assembly tape, which during transport and use slips out of place relatively easily due to the protective film. The single fold in the adhesive assembly tape along a slit in the protective film permits the known adhesive assembly tape to be applied effectively, even in areas that are difficult to access. Although the simple fold along a slit provides reliable processability, during processing the protective film must first be removed along the slit of the fold edge prior to actually applying the cited adhesive assembly tape. Also, in certain applications, especially in very spatially constrained circumstances, it can be desirable to optimize ease of use even further.

Patent DE 103 37 880 (US 2005/0058798 A1), from the same applicants as the present invention, describes an assembly tape that is for sealing joints, in particular in home construction, and that has at least one first folded section folded over along a first folding edge and a protective film for an adhesive coating having at least a first slit that runs at a location other than the first folding edge. The tape can have a second folded section that is folded over along a second folding edge. A perforation area of the tape can be provided.

Utility model DE 201 21 253 U1 describes a multi-component, tape-like connecting element, comprising a plurality of sections, between a frame component, e.g. a window frame, and masonry, having adhesiveness to the frame component, whereby the connection to the masonry, which surrounds the frame component when installed and is adjacent thereto, is attained via a strip made of a lasting adhesive mass. A releasable expansion reserve is provided in order to compensate any elongations in the masonry and/or the frame component.

The underlying object of the invention is to provide a pressure-sensitive tape for closing, sealing, and gluing joints, in particular in housing or building construction, and in particular joints in corners and edges, that overcomes the disadvantages of the prior art and in particular, despite simple and thus cost-effective design, provides optimum sealing while simultaneously further improving ease of use, in particular in difficult and/or spatially constrained circumstances and when the joints to be sealed vary in width.

SUMMARY OF THE INVENTION

The inventive pressure-sensitive tape for closing, sealing, and gluing joints, in particular in housing construction, and in particular in home construction, e.g. between masonry and a frame component, for instance a window frame, or even e.g. between drywall walls or walls that meet one another, and in particular joints in corners and edges, which are particularly difficult to reach, has a backing on the tape top side, an adhesive coating for at least a portion of the backing on the tape bottom side, and a removable protective film for the adhesive coating on the tape bottom side. The tape bottom side is the side that, when the inventive tape is used, can normally be applied e.g. to the frame part when installed. In at least one edge area the tape inventively has at least one perforation area where at least the backing is perforated, and the tape has at least one expansion reserve (D). A plurality of expansion reserves (D) can also be provided, preferably over and/or adjacent to one another. When needed during use the expansion reserve (D) can be completely or at least partially pulled out and/or unfolded. The at least one perforation area inventively represents a plastering area or is a plastering area that can be plastered over for permanently bonding to the masonry or to the plaster. (The term "masonry" as used herein refers not only to masonry walls but also the walls of other materials such as walls of concrete or plaster or plasterboard, the latter also being known as drywall.) The perforations in the perforation area should therefore be sufficiently large for this purpose so that appropriate depressions result into which any plaster can penetrate, at least somewhat. This plaster area can thus be embodied such that it is not water-tight or windproof.

In accordance with the invention, the tape has at least one perforation area with perforations whose average diameter is preferably at least 3 mm. (With respect to non-circular perforations, the "diameter" corresponds to the maximum width, for example the dimension of the major axis of an oval.) Thus for instance it can be assured that the at least one perforation area of the tape can be plastered over, which results in particularly good anchoring, without jeopardizing the sealing action of the tape. The at least one perforation area is embodied in at least one edge area of the tape; however, it is also possible to provide both edge areas of the tape with an appropriate perforation area. In particular, the edge areas that can be embodied as perforation areas can also correspond to a corresponding first or second folded section of the tape. However, depending on the application at least the center strip of the tape, which should preferably not be perforated, should be wider than the maximum width of the joint to be sealed in order to assure optimum sealing. Optimum sealing is enabled inventively by the provision of the expansion reserve (D) under any installation conditions, that is, even when the widths of the joints to be sealed vary widely. Pulling out and/or unfolding the expansion reserve (D) permits adaptation to the joint width without there being a need to keep different tapes having different widths on hand and having to apply such tapes in combination, sometimes by sections in complex work steps, which does not even result in optimum sealing in every case. The flexibility and adaptability of the inventive tape, which are provided by the expansion reserve (D), also ensures, specifically in combination with the inventive perforation area, that this perforation area can always assure certain bonding to the masonry and that when the joints to be sealed are wide that it is not just a portion of the perforation area that is joined to the masonry when installed. Sealing is also improved because it can always be inventively assured that no leaks through the perforation area can occur in the area of the width of the joints to be sealed because the corresponding perforation area can always be completely and securely joined to the masonry because the expansion reserve (D) makes it possible to adapt to the joint width. Because the perforated longitudinal segment of the inventive tape is disposed at least on one edge area of the tape and the center strip preferably remains unperforated, the perforations are prevented from leading to leaks when the joint to be sealed is covered with the appropriately configured pressure-sensitive tape. As stated, the expansion reserve (D) permits simple adaptation of the inventive tape to the different widths of the joints to be sealed.

Preferably the perforations pass through the backing, the adhesive coating, and the removable protective film, i.e., in accordance with one advantageous embodiment of the invention, the backing, adhesive coating, and removable protective film are perforated with these perforations that pass through them. Such perforations can be produced in a particularly simple and cost-effective manner using appropriate punches, which leads to favorable production costs. In general, the protective film and the backing prevent a perforation tool from coming into contact with the adhesive layer of the pressure-sensitive adhesive tape. However, in general it is also possible for the adhesive tape to be provided with perforations in the area that is not covered with the protective film.

The perforations can preferably be embodied largely in circular, polygonal, or oval shapes.

The expansion reserve (D) is preferably spaced from the perforation area in the transverse direction of the tape. This particularly assures anchoring of the inventive tape to the masonry in the perforation area (in particular by plastering thereover, which is thereby especially simple to undertake).

It is particularly preferred that the expansion reserve (D) is largely centrally arranged, as seen in the transverse direction of the tape.

The expansion reserve (D) is particularly at least one Z-fold in the tape, preferably a pleated fold in the tape. A plurality of Z-folds are also possible.

In accordance with another preferred embodiment of the inventive tape, an (additional, second) adhesive coating of at least a portion of the backing can be provided on the tape top side, preferably on the tape top side with a removable protective film of this adhesive coating. It is particularly preferred that the (additional, second) adhesive coating of at least a portion of the backing is provided on the tape top side in the perforation area. Processability of the inventive tape preferably embodied in this manner can thus be further improved depending on the application.

The perforations preferably pass through the backing, the adhesive coating of at least a portion of the backing on the tape top side, and the removable protective film.

In accordance with one preferred embodiment of the inventive tape, at least a center section of the tape is embodied non-adhesive, preferably without the adhesive coating and/or the additional, second adhesive coating. In addition, depending on the application, the at least one perforation area (if desired also in combination with the center section) can be embodied non-adhesive.

If the adhesive coating on the tape bottom side and/or the additional, second adhesive coating on the tape top side of the inventive tape in accordance with the preferred embodiment has a non-adhesive center strip, preferably arranged largely in the center, this particularly facilitates the gluing of joints between two components that are at right angles to one another, because non-perpendicular gluing with wrinkles is thus prevented in a simple manner specifically in the area where these two components meet. The sealing action is completely retained, since the two edge areas of the tape can be glued appropriately.

In accordance with another preferred embodiment of the inventive tape, at least one first folded section of the tape is folded over in the transverse direction along a first folding edge that runs in the longitudinal direction of the tape, whereby the protective film preferably has at least a first slit, the first folding edge preferably running at a different location than the first slit.

The first folded section is preferably the at least one perforation area or the first folded section is the section opposing the at least one perforation area.

Under certain conditions, using the inventively preferred combination of a fold in the tape along a first folding edge and a first slit that runs at a different location than the first folding edge results in further improved processability of the tape. Using the pre-fold can simplify application in corners and to edges, while the slit offers the option of removing the protective film from the adhesive coating by section and applying the tape at such an adhesive section for instance to a window frame that is to be sealed. Since the slit and the folding edge do not coincide, the advantage results that only the area of the inventive tape that is to be applied has to be removed from a corresponding section of the protective film, while the folding edge runs at a distance from the adhesive section. This offers advantages in particular when built-ins are to be done over a corner and this corner runs at another location than the area of the component to which the tape is to be applied. Given such special geometric conditions, the appropriate inventively configured pressure-sensitive tape thus offers the advantage of further improved processability, assured application and thus sealing under all circumstances also being ensured.

One inventively preferred tape can for instance be used in drywall and/or in concrete and masonry structures. Thus risk is avoided that during the subsequent plastering process the tape is cut through by a blow from the plaster trowel, thus causing the tape to lose its air-tight quality, in particular at locations that are physically difficult to access, such as 90° corners, e.g. between two drywalls that meet, or even in the area of a window, where the inventive tape can be applied as precisely as possible to the window frame. The pre-fold saves the user a lot of time, in particular when large window areas with a plurality of inserted window frames are to be inserted into exterior walls in new home or building construction. Otherwise these folds would have to be made manually; this is not necessary in accordance with the invention. If the inventive adhesive tape is added to wood construction, it is enough that due to the narrower joint width occurring between adjacent components, only individual sections or edge sections of the sealing tape have to be glued, so that very precise and rapid processability of the inventive tape is facilitated using appropriate inventive arrangement of a suitable slit or slits.

One embodiment of the invention is preferred in which the tape has a second folded section that is folded over in the transverse direction along a second folding edge that runs in the longitudinal direction of the tape. Using this second folded section it is for instance possible to use an appropriately configured pressure-sensitive adhesive tape in a simple manner in the context of an application between a plurality of U-profiles.

The protective film of the inventive tape can preferably have at least one second slit in the longitudinal direction of the tape. This results in at least one other opportunity to remove the protective film appropriately by section from the tape bottom side or from the adhesive coating on the tape bottom side. Thus there is the option of providing two adhesive sections, where one section of the advantageously configured inventive tape remains covered with the protective film, for instance a central area, that is situated between the component and the actual wall or masonry.

In accordance with another preferred embodiment of the invention, the second folding edge coincides with the second slit of the protective film. Thus there is the option of removing the protective film for the adhesive coating from the second folded section and applying the corresponding assembly tape in the area of the second folded section.

In accordance with another preferred embodiment, however, it is also possible that the second folding edge does not coincide with the first slit and/or with the second slit of the protective film. Thus a flexible configuration option is provided in which the protective film does not necessarily have to be removed from the entire second folded section along the first slit and/or along the second slit. Thus individual adaptation to different situations is possible, whereby in particular even only a portion of the second folded section permits the protective film to be removed using an appropriately added slit.

The same is true for the embodiment of the invention in which preferably the first folding edge does not coincide with the second slit in the protective film.

Non-coinciding folding edge(s) and slit(s) can preferably be spaced at a distance of 1 mm to 25 cm from one another.

In accordance with one preferred embodiment of the invention, one edge section of the protective film projects over the first folding edge and/or the second folding edge. In this manner one or two grip section(s) result(s) that make(s) it possible to remove the protective film in a simple manner by grasping this edge section. This makes it even easier to manage the inventive pressure-sensitive adhesive film. The section(s) can preferably have a width in the range of 1 mm to 1 cm.

Depending on the individual application situation, different arrangements of the folded sections can be particularly advantageous for processability.

In accordance with one preferred embodiment of the invention, the first folded section and the second folded section can be opposing edge sections of the inventive tape; however, it is also possible that in accordance with another preferred embodiment of the invention, the first folded section and the second folded section are adjacent to one another as seen in the transverse direction of the tape. In accordance with another preferred embodiment, the first folded section and the second folded section can also be disposed at least partially one on top of the other when the tape is folded.

In accordance with another preferred embodiment of the invention, tape bottom side can be placed upon tape bottom side in the area of the first folded section and/or in the area of the second folded section; however, in accordance with another preferred embodiment, it is also possible for tape top side to be placed on tape top side in the area of the first folded section and/or in the area of the second folded section.

An embodiment of the invention in which at least a portion of the adhesive coating is not covered with the protective film is particularly preferred. Along the portion of the adhesive coating of the inventive tape that is not covered with the protective film, the protective film does not first have to be carefully removed during the placement process, which results in more rapid processability of the inventive tape. This also prevents any distortions or folds from occurring in the tape, after it has been glued on, due to the film having to be removed. Also, a tape configured in this manner does not require any additional assembly tape dispenser for holding and dispensing the tape, because when folded or rolled up, the inventive tape in accordance with this preferred embodiment will not bunch up due to its adhesive coating remaining in part free of the protective film. The tape is thus particularly simple and reliable to use. In addition, the tape can thus be transported without special packaging or protective measures by the processor to the site of application or the construction site.

In accordance with one preferred embodiment of the invention, the adhesive coating of the tape is not covered with the protective film at least in the area of the first folded section and/or in the area of the second folded section. That is, the area or areas of the inventive tape that are folded over preferably does not/do not have any protective film. Thus it is possible to unroll this/these area(s) directly from the roll and transfer them simply in constrained physical spaces, for instance edges or U-profiles, without additional aids or work steps such as for instance removing the protective film or tedious folding, this resulting in reliable sealing along with further simplified processability. This simple form of processing saves up to half the work time compared to the use of tapes from the prior art.

Preferably the width of the first and/or second folded section or the width of the folded sections can be narrower than the width of the non-folded tape area. Preferably the width of the first and/or second folded section or the width of the folded sections can also have the same or largely the same width as the width of the non-folded tape area. Preferably the width of the first and/or second folded section or the width of the folded sections can also be wider than the width of the non-folded tape area. The width of the first and/or second folded section or the width of the folded sections can preferably be at least 3 mm, preferably at least 8 mm, even more preferably at least 12 mm, and/or can further preferably not be the same as the non-folded tape area and/or can even further preferably be wider than the width of the non-folded tape area.

In order to assure secure adhesion of the inventive pressure-sensitive tape to a wide variety of different materials, even under adverse weather conditions (cold, moisture), and to attain the most reliable possible sealing of the inventive pressure-sensitive tape under all circumstances, in accordance with one preferred embodiment the backing comprises a material from the group paper, plastic, woven material, non-woven material, or a combination of at least two of these materials, and/or the adhesive coating on the tape bottom side and/or any adhesive coating on the tape top side preferably comprises at least one material from the group of pressure-sensitive acrylate adhesives, rubber adhesives, butyl adhesives, hotmelt, or a combination of at least two of these adhesives.

In general adhesive masses (such as e.g. in DE 201 21 253 U1) must be applied with adequate thickness/mass to adhere adequately to porous or broken masonry. In addition, they tend to lose their adhesiveness as they age. On the other hand, adhesives in accordance with the invention cannot be applied thickly enough/with enough mass to guarantee permanent final adhesion and thus a seal on porous or broken masonry. Therefore, in the preferred embodiment they are aids for the processor until the plaster is applied and the permanent bond to the masonry located thereunder is assured by the perforations.

In accordance with the invention, it is preferred that the thickness of the adhesive coating and/or adhesive coatings is up to 0.5 mm, more preferably the thickness is less than 0.3 mm.

The processability of the invective tape is particularly made easier when, in accordance with one preferred embodiment, the tape is created such that at least its backing can be torn manually transverse to the longitudinal direction of the tape. Preferably the protective film can also be torn manually transverse to the longitudinal direction of the tape. Thus lengths of the tape can be created simply and without tools when it is being placed.

The inventive pressure-sensitive tape is particularly easy to manage in accordance with one preferred embodiment in which the tape is rolled up in an adhesive tape roll while folded. This is particularly easy to manage on site during application, even without an additional dispenser.

In accordance with one preferred embodiment of the inventive tape, provided at least at the side of the first folding edge of the roll is an intermediate layer that is used to prevent adhesion in the area of the first folding edge prior to the tape actually being used. Where required, the intermediate layer reliably covers exposed adhesive coating there in the area of the first folding edge so that prior to the use of the tape it is reliably protected from becoming soiled. This further improves the processability of the tape thus inventively configured.

Preferably the inventive tape when not folded and when the expansion reserve (D) has not been pulled out/unfolded has a width of at least 3 cm, preferably a width in the range of 3 cm to 50 cm, more preferably a width in the range of 4 cm to 30 cm, and most preferably a width in the range of 4.5 cm to 20 cm. On the one hand, these dimensions also permit certain sealing of somewhat wider joints, and on the other hand excessive width of the tape is prevented, which excessive width can make handling the tape more difficult and thus lead to wrinkles and therefore leaks when the inventive tape is placed. When needed, the expansion reserve (D), which, when pulled out/unfolded, can e.g. double or triple or quadruple its width of 1 to 20 cm (not pulled out/not unfolded) can be used safely and reliably for sealing with the inventive tape, even for joints that vary in width.

In accordance with another preferred embodiment of the invention, at least one side of the backing can comprise a material, in particular an open-pore material, that has good adhesion properties for plastering. The adhesion of the tape to the plaster substrate is thus further improved and it is prevented that parts of the masonry plastering detach from a tape configured in this manner.

In accordance with another preferred embodiment of the invention, the tape can have in the transverse direction a first diffusion-open tape section and a second diffusion-closed tape section following the at least one perforation area.

In accordance with another preferred embodiment of the invention, the tape can have in the transverse direction a first diffusion-closed tape section and a second diffusion-open tape section following the at least one perforation area.

The inventive band described in the foregoing can be inventively used for closing, sealing, and gluing joints, in particular joints in corners and edges, between a frame component, in particular a window frame or a door frame, and facade openings or roof openings, in home construction.

The invention is described in greater detail in the following using the embodiments of the invention depicted in the drawings and described as examples.

BRIEF DESCRIPTION OF THE DRAWINGS

FIG. 1 is a sectional view of a first embodiment of a tape for the invention in the transverse direction of the tape.

FIG. 2 is a sectional view of a second preferred embodiment of the inventive tape in the transverse direction of the tape.

DETAILED DESCRIPTION OF THE INVENTION

In general it should be remarked that the depictions in FIGS. 1 and 2 are not to scale and merely provide a schematic illustration of the structure and configuration of embodiments of the inventive tape. In particular the relative thicknesses of the individual layers are not provided to scale. In general the inventive tape preferably has a width of at least 3 cm, when not folded and with an expansion reserve (D) that has not been unfolded/pulled out. Perforations have an average diameter of at least 3 mm.

FIG. 1 is a schematic sectional view of a first preferred embodiment of a pressure-sensitive tape in accordance with the invention along the transverse direction of the tape. The inventive tape in accordance with FIG. 1 has a backing 1 on a tape top side, an adhesive coating 2 of the backing 1 on the tape bottom side, and a removable protective film 3 on the tape bottom side. The tape bottom side is depicted at the top in FIG. 1, the tape top side is below. An (other, second) adhesive coating 6 of at least a portion of the backing 1 on the band top side is provided with a removable protective film 7 of this adhesive coating 6 on the tape top side. The tape inventively has a perforation area 4 in an edge area of the tape, with perforations 5. The perforations 5 extend through the backing 1, the adhesive coating 2, and the removable protective film 3. Furthermore, the tape inventively has, spaced from the perforation area in the transverse direction of the tape, an expansion reserve (D) that can be unfolded/pulled out and that, seen in the transverse direction of the tape, is arranged largely centrally and, as shown here, that is embodied as a simple Z-fold in the tape. However, a plurality of Z-folds in the tape can be provided over or adjacent to one another, and/or a pleated fold in the band can be provided, as an expansion reserve (D).

FIG. 2 provides a schematic sectional view of a second embodiment of the invention along the transverse direction of the inventive tape. In FIG. 2, identical reference numbers indicate identical elements of the invention. The embodiment of the invention illustrated in FIG. 2 largely corresponds to the embodiment of the invention depicted in FIG. 1, with the difference that there (in FIG. 2) no adhesive coating 6 with protective layer 7 is provided on the band top side, and that in the embodiment depicted in FIG. 2 a first folded section 8 of the tape is folded over in the transverse direction along a first folding edge 9 running in the longitudinal direction of the tape and a second folded section 11 of the tape is folded over in the transverse direction along a second folding edge 12 that runs in the longitudinal direction of the tape. A first slit 10 in the protective film 3 is provided in the longitudinal direction of the tape, this first slit 10 not coinciding with the first folding edge 9. A second slit 13 of the protective film 3 is provided in the longitudinal direction of the tape, this second slit 13 not coinciding with the second folding edge 12. An edge section 14 of the protective film 3 projects over the second folding edge 12 and thus acts as a grip section for pulling off the protective film 3.

In accordance with the embodiment depicted in FIG. 2, the inventive tape is folded upon itself such that the first folded section 8 is the perforation area 4.

The invention claimed is:

1. A roll of housing-construction pressure-sensitive tape for closing, seal, and gluing joints, the tape comprising a backing having a top side and a bottom side, and adhesive coating on at least a portion of the bottom side of the backing, a removable protective film on at least a portion of the adhesive coating, perforations formed at least through the backing at least one lateral edge area on the tape along the length of the tape, the tape having at least one pleated fold in the tape configured so as to provide an expansion reserve which permits width of the tape to be expanded, wherein the pleated fold is spaced from the perforation area in a widthwise direction of the tape, wherein the expansion reserve is adapted to be completely expanded and is also adapted to be partially expanded to bridge a housing-construction joint, wherein the backing, the adhesive coating, and the removable protective film are rolled-up.

2. A roll of housing-construction pressure-sensitive tape for closing, seal, and gluing joints, the tape comprising a backing having a top side and a bottom side, and adhesive coating on at least a portion of the bottom side of the backing, a removable protective film on at least a portion of the adhesive coating, perforations formed at least through the backing at at least one lateral edge area on the tape along the length of the tape, the tape having at least one longitudinal Z-fold in the tape configured so as to provide an expansion reserve which permits width of the tape to be expanded, wherein the at least one longitudinal Z-fold is spaced from the perforation area in a widthwise direction of the tape, wherein the expansion reserve is adapted to be expanded to bridge a housing-construction joint, wherein the backing, the adhesive coating, and the removable protective film are rolled-up.

3. The roll of tape of claim 2, wherein the expansion reserve is arranged substantially centrally with respect to the width of the tape.

4. The roll of tape of claim 2, wherein the perforations are of average diameter at least 3 mm when circular or average maximum width 3 mm when not circular.

5. The roll of tape of claim 4, wherein the perforations pass through the backing, the adhesive coating and the protective film.

6. The roll of tape of claim 4, wherein the perforations are circular, polygonal or oval.

7. The roll of tape of claim 2, further comprising an adhesive coating on at least a portion of the top side of the backing.

8. The roll of tape of claim 7, further comprising a removable protective film on at least a portion of the adhesive coating on the top side of the backing.

9. The roll of tape of claim 8, wherein the adhesive coating on at least a portion of the top side of the backing is in the perforations area.

10. The roll of tape of claim 2, wherein the perforations pass through the backing, the adhesive coating of at least a portion of the top side of the backing and the removable protective film on the adhesive coating of at least a portion of the top side of the backing.

11. The roll of tape of claim 2, wherein an area of the backing which is substantially central with respect to the width of the tape is free of the adhesive coating.

12. The roll of tape of claim 2, further comprising a first longitudinal slit in the protective film.

13. The roll of tape of claim 12, wherein the first longitudinal slit does not coincide with any folds in a widthwise direction of the tape.

14. The roll of tape of claim 12, further comprising a second longitudinal slit in the protective film.

15. The roll of tape of claim 14, wherein the second longitudinal slit does not coincide with any folds in a widthwise direction of the tape.

16. The roll of tape of claim 2, wherein an edge section of the protective film projects over an edge of a fold in the widthwise direction of the tape.

17. The roll of tape of claim 2, wherein the expansion reserve comprises a plurality of Z-folds.

18. The roll of tape of claim 2, wherein a first Z-fold overlaps at least part of a second Z-fold.

19. The roll of tape of claim 2, wherein at least a portion of the adhesive coating on the bottom side of the backing is not covered with the protective film.

20. The roll of tape of claim 19, wherein the portion of the adhesive coating on the bottom side of the backing not covered with the protective film comprises at least one of an area of the first folded section or an area of the second folded section.

21. The roll of tape of claim 2, wherein the backing comprises a material selected from the group consisting of paper, plastic, woven fabric, non-woven fabric or combinations of at least two thereof.

22. The roll of tape of claim 2, wherein the backing is air proof.

23. The roll of tape of claim 2, wherein the adhesive coating is selected from the group consisting of pressure-sensitive acrylate adhesives, pressure-sensitive rubber adhesives, pressure-sensitive butyl adhesives, pressure-sensitive hotmelt adhesives or a pressure-sensitive combination of at least two of the foregoing adhesives.

24. The roll of tape of claim 2, wherein the adhesive coating is of a thickness of up to 0.5 mm.

25. The roll of tape of claim 2, wherein the adhesive coating is of a thickness less than 0.3 mm.

26. The roll of tape of claim 2, wherein the tape is of width at least 3 cm.

27. The roll of tape of claim 2, wherein the width of the tape with the expansion reserve being folded is 4 cm. to 30 cm.

28. The roll of tape of claim 2, wherein the width of the tape with the expansion reserve being folded is 4.5 cm. to 20 cm.

29. The roll of tape of claim 2, wherein at least one side of the backing comprises a material having open pores thereby to provide good adhesion for plastering.

30. A roll of housing-construction pressure-sensitive adhesive tape, comprising:

backing having a top side and a bottom side;

an adhesive coating on at least a portion of the bottom side of the backing; and a removable protective film on at least a portion of the adhesive coating, wherein the tape comprises perforations formed at least through the backing at at least one lateral edge area on the tape, and wherein the tape is configured so as to provide an expansion reserve which permits a width of the tape to be expanded, the expansion reserve being arranged substantially centrally with respect to the width of the tape and comprising at least two folds that form a Z-fold, wherein the expansion reserve is adapted to be expanded to bridge a housing-construction joint, wherein the backing, the adhesive coating, and the removable protective film are rolled-up.

* * * * *

UNITED STATES PATENT AND TRADEMARK OFFICE
CERTIFICATE OF CORRECTION

PATENT NO. : 7,867,591 B2
APPLICATION NO. : 11/598878
DATED : January 11, 2011
INVENTOR(S) : Marco Sieber and Reto Sieber It is certified that error appears in the above-identified patent and that said Letters Patent is hereby corrected as shown below:

Title Page; item (57);

Line 2, (Abstract), Column 2, Line 3, after "tape" insert -- top --, therefor.

Line 5, (Abstract), Column 2, Line 7, delete "on" and insert -- one --, therefor.

Claim 2, Column 9, Line 43, delete "at at least" and insert -- at least --, therefor.

Claim 30, Column 11, Line 4, delete "at at least" and insert -- at least --, therefor.

Signed and Sealed this
Twenty-second Day of March, 2011

David J. Kappos
*Director of the United States Patent and Trademark Office*